(12) United States Patent
Milliron et al.

(10) Patent No.: US 7,944,443 B1
(45) Date of Patent: May 17, 2011

(54) SLIDING PATCH DEFORMER

(75) Inventors: Timothy S. Milliron, Berkeley, CA (US); Sajan Skaria, Alameda, CA (US)

(73) Assignee: Pixar, Emeryville, CA (US)

( * ) Notice: Subject to any disclaimer, the term of this patent is extended or adjusted under 35 U.S.C. 154(b) by 888 days.

(21) Appl. No.: 11/760,640

(22) Filed: Jun. 8, 2007

Related U.S. Application Data

(60) Provisional application No. 60/812,293, filed on Jun. 9, 2006.

(51) Int. Cl.
*G06T 15/00* (2011.01)

(52) U.S. Cl. .......................... 345/424; 345/419; 345/473

(58) Field of Classification Search .................. 345/424, 345/373, 374, 375, 473, 474, 475, 419, 422
See application file for complete search history.

(56) References Cited

U.S. PATENT DOCUMENTS

| | | | | |
|---|---|---|---|---|
| 6,054,999 A * | 4/2000 | Strandberg | | 345/474 |
| 6,215,503 B1 * | 4/2001 | Snyder et al. | | 345/629 |
| 6,476,807 B1 * | 11/2002 | Duluk et al. | | 345/421 |
| 7,120,311 B2 * | 10/2006 | Snyder | | 382/276 |
| 7,292,250 B2 * | 11/2007 | Sepulveda | | 345/473 |
| 7,548,238 B2 * | 6/2009 | Berteig et al. | | 345/426 |

* cited by examiner

*Primary Examiner* — Phu Nguyen

(74) *Attorney, Agent, or Firm* — Law Office of Jonathan Hollander PC

(57) ABSTRACT

Points can be manipulated through multiple operations with respect to a guide surface using only a single projection operation. A point is projected from its native coordinate system, such as an object space or world space coordinate system, into the parametric space of an unposed guide surface. The projected point is manipulated in the parametric space according to one or more desired operations. The guide surface can be posed to further implement other operations. The guide surface can then be evaluated at the modified parametric space point to determine a corresponding point in the native coordinate system for further manipulation and/or rendering. The manipulation of the point in the parametric space of the guide surface can be expressed through one or more animation variables. The values of multiple animation variables can be used to determine a single operation on the point in parametric space.

28 Claims, 7 Drawing Sheets

SLIDING PATCH DEFORMER

CROSS-REFERENCE TO RELATED APPLICATIONS

This application claims priority to U.S. Provisional Patent Application No. 60/812,293, entitled "Sliding Patch Deformer and Programmable Visible Surface Compositing," and filed Jun. 9, 2006, which is incorporated by reference herein for all purposes. This application is related to U.S. patent application Ser. No. 11/760,665, filed Jun. 8, 2007, and entitled "Programmable Visible Surface Compositing," which is incorporated by reference herein for all purposes.

BACKGROUND OF THE INVENTION

The present invention relates to the field of computer graphics, and in particular to methods and apparatus for creating, modifying the attributes and appearance of objects in computer graphics images. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

In computer-generated animation, a character's appearance is defined by a three-dimensional computer model. To appear realistic, the computer model of a character is often extremely complex, having millions of surfaces and tens of thousands of attributes. Due to the complexity involved with animating such complex models, animation tools often rely on animation variables to define the character's animation.

Animation variables, which are sometimes referred to as avars, are parameters used by functions to modify the pose or bodily position of an object or character model. Animation variables and their associated functions are used to abstract complicated modifications to a character model to a relatively simple control. For example, animation variables can specify the rotation angles of the joints of a character model, thereby positioning the character model's limbs and appendages. More complicated animation variables can define the degree of opening of a character's mouth. In this example, the value of the animation variable is used to determine the position of the many different parts of the character model needed to open the characters mouth to the desired degree. The animation software tools then modify the character model according to the final posed armature to create a character model with an open mouth.

Often, it is desirable to pose geometry relative to another surface, referred to as a guide surface. For example, a surface warp operation allows model geometry to follow changes in the guide surface. As the guide surface changes shape, a surface warp operation changes other model geometry, such as another surface, to follow the change in the guide surface shape. In another example, a surface pulling operation allows the one-dimensional motion of one surface or other portion of model geometry to follow the general shape of the guide surface. In still another example, a normal translate operation moves model geometry in a direction normal to the guide surface. This allows the model geometry to be moved towards or away from the guide surface, while following the shape of the guide surface.

Animation software tools often need to perform many complex projections, transformation, and other computationally expensive operations on hundreds or thousands of particles, points, or other portions of model geometry to convert animation variable values into posed models. Previously, operations relative to the guide surface, such as the example surface warp, surface pulling, and normal translate operations, were performed using separate sequences of projections and transformations. This makes these types of operations computationally expensive to perform.

During rendering, model geometry is often divided into geometry samples, such as such as particles, polygons, micropolygons, or fragments. The camera viewpoint is used project geometry samples onto an image plane including image sample points, which correspond with pixels or sub-pixel samples. A visibility function evaluates the one or more geometry samples projected onto each image sample to determine the value, such as the color, of the image sample.

Previously, the visibility function was fixed and inflexible. Previous visibility functions determine the contribution of geometry samples to an image sample value based on their depth (i.e. distance from the camera viewpoint) and opacity. Previous visibility functions accumulate opacity and color strictly according to the depth order of geometry samples associated with an image sample.

However, deformations of geometry can introduce small errors may cause the portions of the model geometry to inadvertently pass behind the guide surface or other objects. Furthermore, many special illumination and rendering effects, such as motion blur and shadowing, may interact in visually undesirable ways. It is therefore desirable to correct for these visibility issues without having to change the geometry.

It is therefore desirable for a system and method to enable geometry to be moved and otherwise manipulated with respect to a guide surface. It is further desirable to control the visibility of objects to correct for visibility issues as well as to enable other effects.

BRIEF DESCRIPTION OF THE DRAWINGS

The invention will be described with reference to the drawings, in which.

BRIEF SUMMARY OF THE INVENTION

An embodiment of the invention allows multiple operations with respect to a guide surface to be performed using only a single projection operation. A point from model geometry is projected from its native coordinate system, such as an object space or world space coordinate system, into a coordinate system associated with the parametric space of an unposed guide surface. The projected point can then be manipulated in the parametric space according to one or more desired operations. The guide surface can be posed to further implement other operations. The projected and manipulated point can then be inverse transformed from the parametric space of the posed guide surface to its native coordinate system for further manipulation and/or rendering.

Additionally, an embodiment of the invention enables programmable or user-defined visibility functions. In an embodiment, a renderer traverses the set of geometry samples associated with an image sample. Rather than accumulate opacity and color in strict depth order, the renderer can invoke visibility functions associated with some or all of the geometry samples. Each geometry sample's visibility function can access attributes of any other geometry sample associated with the image sample. Furthermore, each geometry sample's visibility function can identify the position of its associated geometry sample and any other geometry samples in the depth sequence of geometry samples associated with an image sample. A visibility function can return any arbitrary value based on attributes of its associated geometry sample, attributes of other geometry samples associated with the image sample, and/or the position of geometry samples in the depth sequence associated with the image sample.

DETAILED DESCRIPTION OF THE INVENTION

Figure 1A:
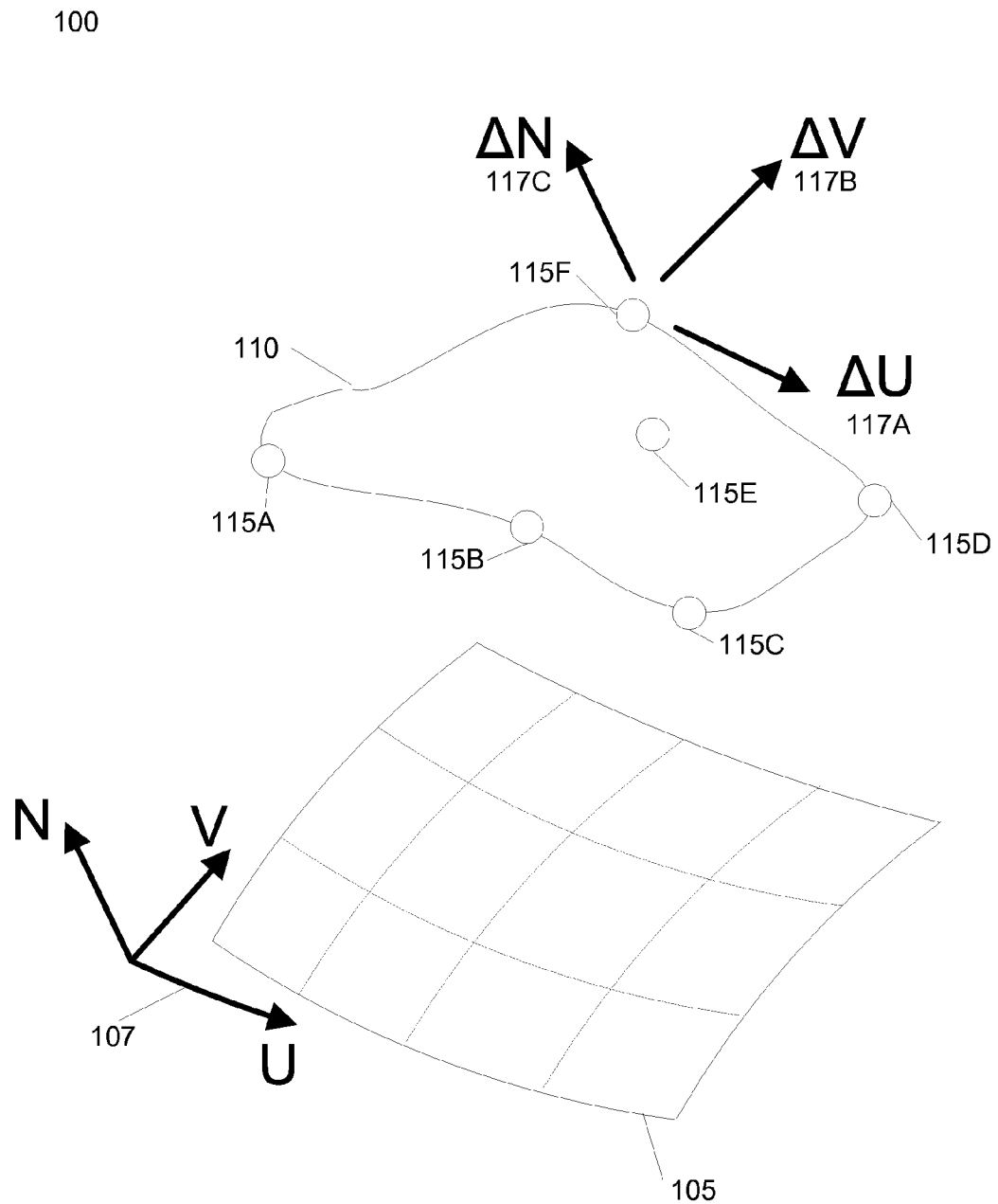
FIGS. 1A-1C illustrate example applications of an embodiment of the invention.
Figure 1B:
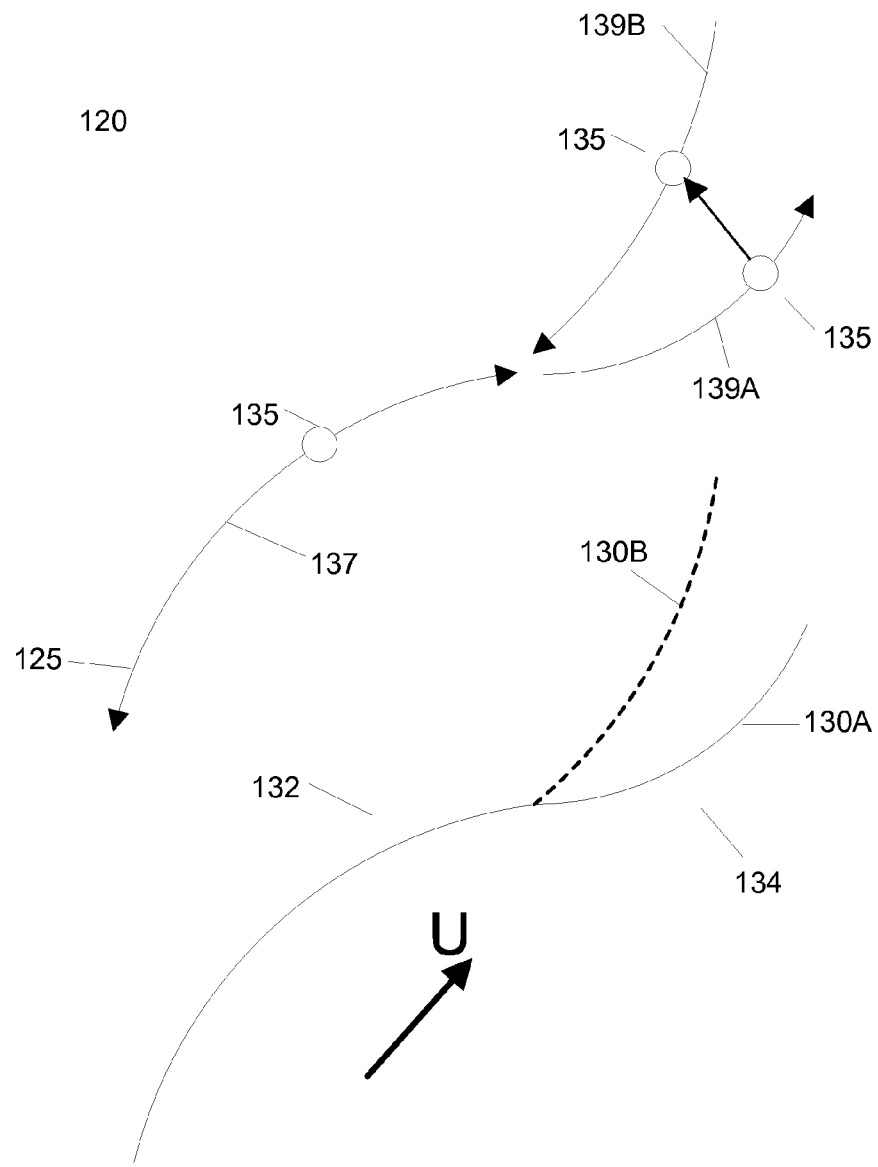
Figure 1C:
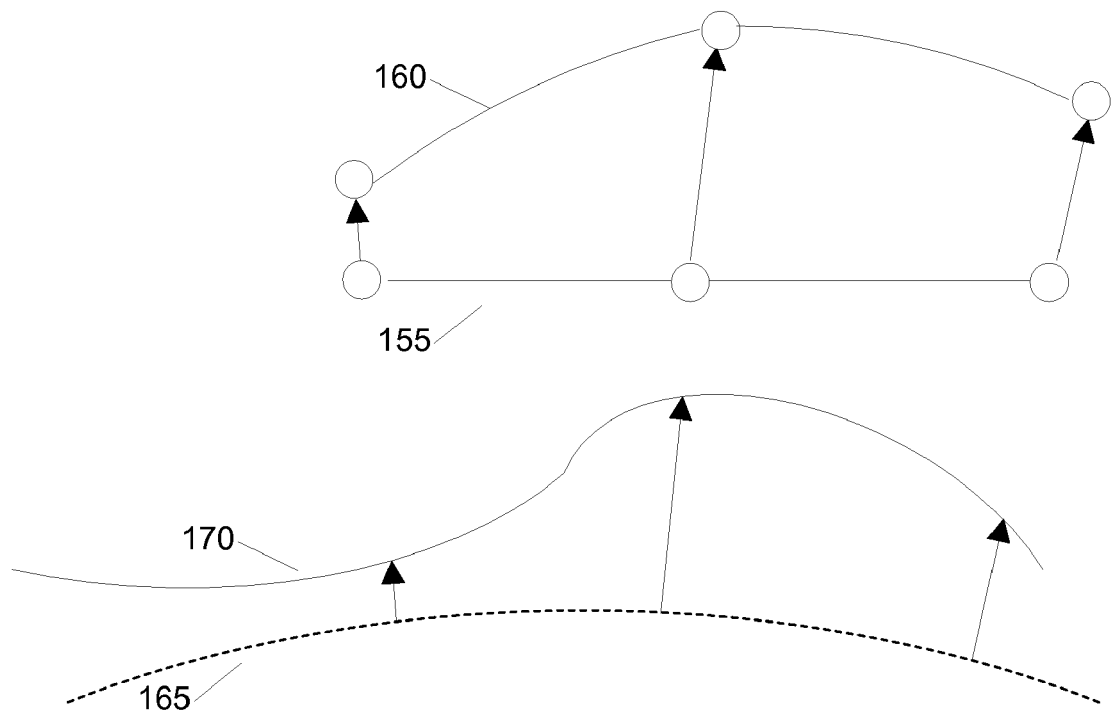

FIGS. 1A-1C illustrate example applications of an embodiment of the invention.

FIG. 1A illustrates an example movement 100 of geometry with respect to a guide surface. This movement may be referred to as a surface pulling operation. A guide surface 105 may be any type of surface with a local coordinate system. The guide surface 105 may or may not be part of an object. The guide surface 105 may optionally be set to be rendered in a scene, or may be set to be invisible to the renderer. Examples of guide surfaces include flat surfaces or polygon meshes; curved surfaces, such as quadratic, cubic, Bezier surfaces or non-uniform rational B-splines (NURBS), subdivision surfaces, or any other higher order surfaces; as well as any other type of surface defined parametrically. The guide surface 105 is associated with a local coordinate system (u,v,n) 107, which defines vectors u and v tangent to the guide surface 105 at any point and a vector n normal to the guide surface at any point. In an embodiment, the local coordinate system 107 is the parametric spaced used to define the guide surface 105. In another embodiment, a local coordinate system 107 may be imposed on the guide surface 105 using techniques known in the art, such as atlasing.

An object 110 includes geometry to be moved relative to the guide surface 105. The object 110 can be created in any manner used to create three-dimensional computer models, including manual construction within three-dimensional modeling software, procedural object creation, and three-dimensional scanning of physical objects. The object 110 can be comprised of a set of polygons; voxels; curved surfaces, such as Bezier surfaces or NURBS; constructive solid geometry; and/or any other technique for representing three-dimensional objects. Additionally, the object 110 can include attributes defining the outward appearance of the object, including color, textures, material properties, transparency, reflectivity, illumination and shading attributes, displacement maps, and bump maps.

In an embodiment, the geometry is defined by one or more points 115, such as 115A, 115B, 115C, 115D, 115E, and 115F, which may define one or more surfaces making up the object. The points 115 may be particles, points, control points, or any other type of entity used to define surfaces or volumes included in object 110. The points 115 can be located on or near the surface of the object 110. Points 115 can also be located within the interior of the object 110. Points 115 can be used to define the surface of the object 110 directly or as intermediate values used to determine the positions of additional points defining the surface of the object 110.

In one application of an embodiment of the invention, points 115 can be moved in one, two, or three dimensions relative to the guide surface 105. As shown in FIG. 1A, a point 115F is moved by amounts $\Delta u$ 117A, $\Delta v$ 117B, and $\Delta n$ 117C. Additionally, points are rotated about the u, v, and n axes. In further embodiments, arbitrary transformations, such as scaling and shearing, can be performed in one or more directions defined by coordinate space 107.

In an embodiment, a user or another modeling or animation application may specify the displacement of each point of an object separately or in aggregate. These displacements may specify movement and/or deformation of the geometry with respect to the guide surface 105. Point displacements may be input directly or as inputs to complicated avars, which are then processed to determine displacements in the (u,v,n) coordinate space 107. The net displacement of control points in the (u,v,n) coordinate space may be determined by the interaction of two or more different avar inputs.

For example, an animation application can define a first animation variable (avar) for sliding object 110 along the guide surface 105 in one or more directions, a second avar for posing or deforming the guide surface 105, a third avar defining how object 110 deforms to follow changes in the pose of the guide surface 105, and a fourth avar defining a normal displacement of object 110 from guide surface 105. An embodiment of the invention can use all of these avar values in conjunction with the attributes of the guide surface 105 and object 110 to determine a single displacement for each point of the object in the coordinate space 107 corresponding to any combination of multiple operations defined by these four avars.

Additionally, the net displacement of points 115 in the (u,v,n) coordinate space may vary from point to point when the shape of the geometry is changed. As shown in detail below, even when the displacement of two or more points 115 is the same in terms of (u,v,n) coordinate space 107, the corresponding displacements of these points 115 in a world, object, or other coordinate space may differ due to the shape of the underlying guide surface 105.

FIG. 1B shows another example movement 120 of geometry with respect to a guide surface. In this example, an object can be moved with respect to different guide surfaces depending upon user specified criteria, such as the net direction of movement. In this example, the surface of an object 125 and the guide surfaces 130 are illustrated in cross-section only for clarity; this embodiment of the invention applies to arbitrary objects and guide surfaces defined in three-dimensional space.

In this example, there are two guide surfaces 130A and 130B. The two guide surfaces 130A and 130B overlap in a first region 132 and diverge in a second region 134. A point 135 of the object moves along a first path 137 when it's projection onto the guide surface is within the first region 132. When the point 135 is moved so that its projection is in the second region 134, the point 135 moves along a path 139A defined by the first guide surface 130A or along path 139B defined by the second guide surface 130B, depending upon its net displacement. For example, when the point 135 has a positive displacement in the u direction, the point will follow the path 139A corresponding with the lower guide surface 130A. Conversely, the point 135 will follow the path 139B corresponding with the upper guide surface 130B when the net displacement in the u direction is negative.

FIG. 1C illustrates another example movement 150 of geometry with respect to the guide surface. In this example, deformations or warping of the guide surface are mirrored by the geometry of the object. In this example, a guide surface 155 in an initial shape or pose is associated with the geometry 160 in an initial pose. When the guide surface changes shape to a new pose 165, as shown in FIG. 1C, the points of the object are displaced according to the deformation or pose of the underlying guide surface 165 to form posed object 170.

Figure 2:
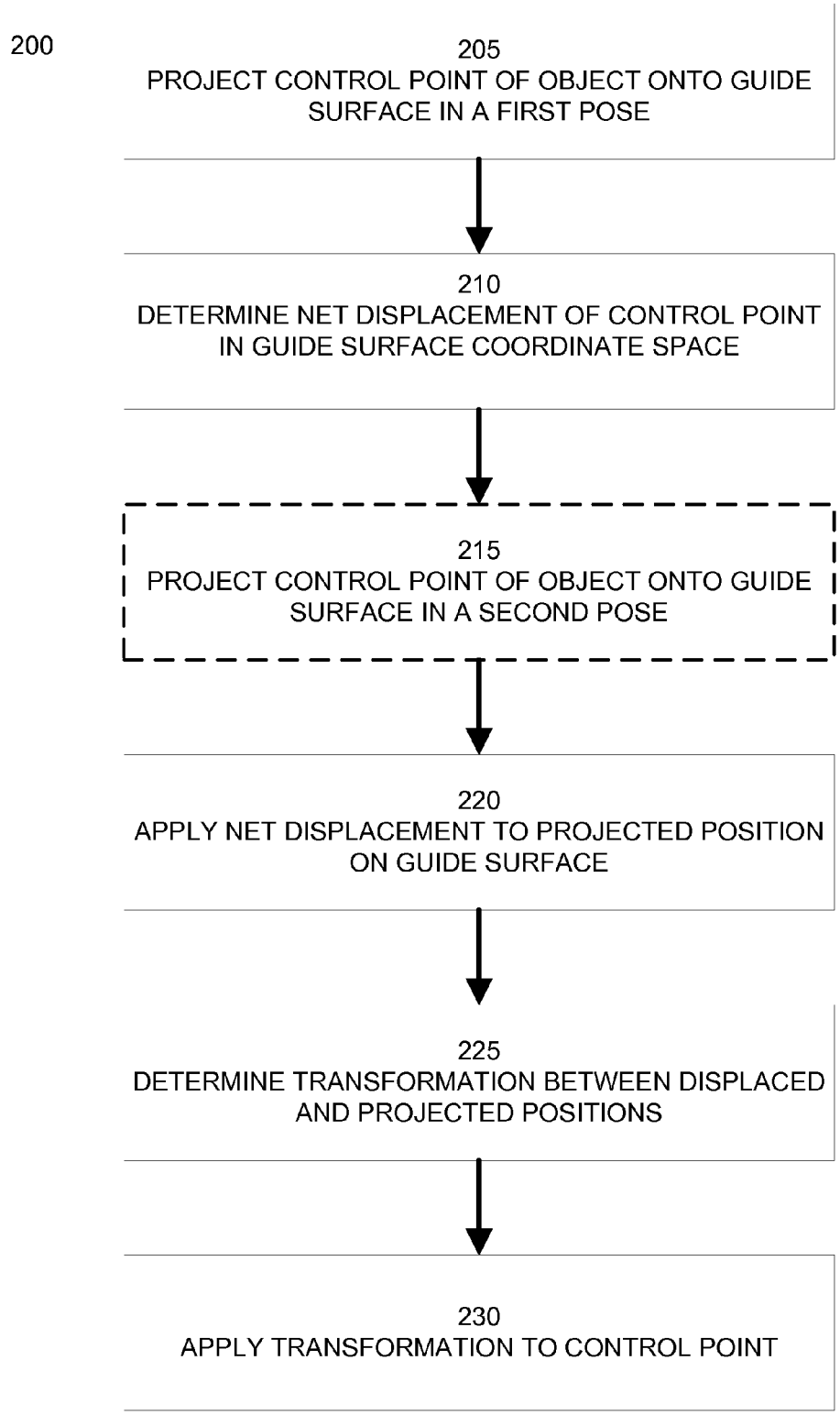
FIG. 2 illustrates a method of determining the position of a control point relative to a guide surface according to an embodiment of the invention.

Embodiments of the invention can utilize all of the above-described types of movement alone or together. FIG. 2 illustrates a method of determining the position of a point relative to a guide surface according to an embodiment of the invention. The method begins at step 205 by projecting a point of an object on to a guide surface in a first pose. The first pose of the guide surface may be its rest or initial pose. In an embodiment, the point is projected in the direction of the normal vector of the guide surface back to a point on the guide surface. As the orientation of the normal vector may change with position within the guide surface, embodiments of the invention may use analytic techniques or iterative numerical techniques to determine this projection.

The result of this projection is a position of the point in the (u,v,n) or other parametric coordinate system of the guide surface in a first pose. The next step 210 then determines the net displacement of the point in the coordinate system of the guide surface, if any. The net displacement of the point can be determined by evaluating one or more avars associated with the movement of the object relative to the guide surface.

If the guide surface deforms, moves, warps, or otherwise changes shape or position to form a second pose, then the next optional step 215 projects the point on to the guide surface in the second pose. The result of this projection is a position of the point in the (u,v,n) or other parametric coordinate system of the guide surface in a second pose.

Step 220 applies the net displacement of the point to the projected position of the point. If the guide surface has not been changed to a second pose, then this net displacement is added to the projected position of the point with respect to the guide surface in the first pose. Otherwise, the net displacement is added to the projected position of the point with respect to the guide surface in the second pose. The result of this step is a displaced projected position of the point. If the net displacement is zero, step 220 may be omitted. In this case, the projected position of the point with respect to the guide surface in the second pose serves as the displaced projected position used by subsequent steps.

Step 225 calculates a coordinate transformation between the projected position of the point with respect to the guide surface in the first pose and the displaced projected position previously. In an embodiment, this transformation is calculated using linear algebra techniques well known in the art. It should be noted that the first and second poses of the guide surface, as well as the net displacement of the point, do not have to be defined in terms of linear operations and coordinate transformations from initial poses and positions. This step only requires that a coordinate transformation can be determined from the resulting projected positions of the point with respect to the guide surface given its first position and its displaced projected position.

Step 230 then applies the coordinate transformation to the point to implement the desired movement. In an embodiment, this transformation is applied to the point in the object or world coordinate system. In another embodiment, this transformation is applied to the point in the (u,v,n) coordinate system of the guide surface. The resulting transformed position can then be reverse projected into the object or world coordinate system. The method 200 of FIG. 2 may be repeated for additional points of an object.

Additionally, deformations of geometry as well as small errors may cause the portions of the geometry to inadvertently pass behind the guide surface or other objects. In a further embodiment, a programmable visible surface compositor can correct for visibility issues without having to change the geometry.

Figure 3:
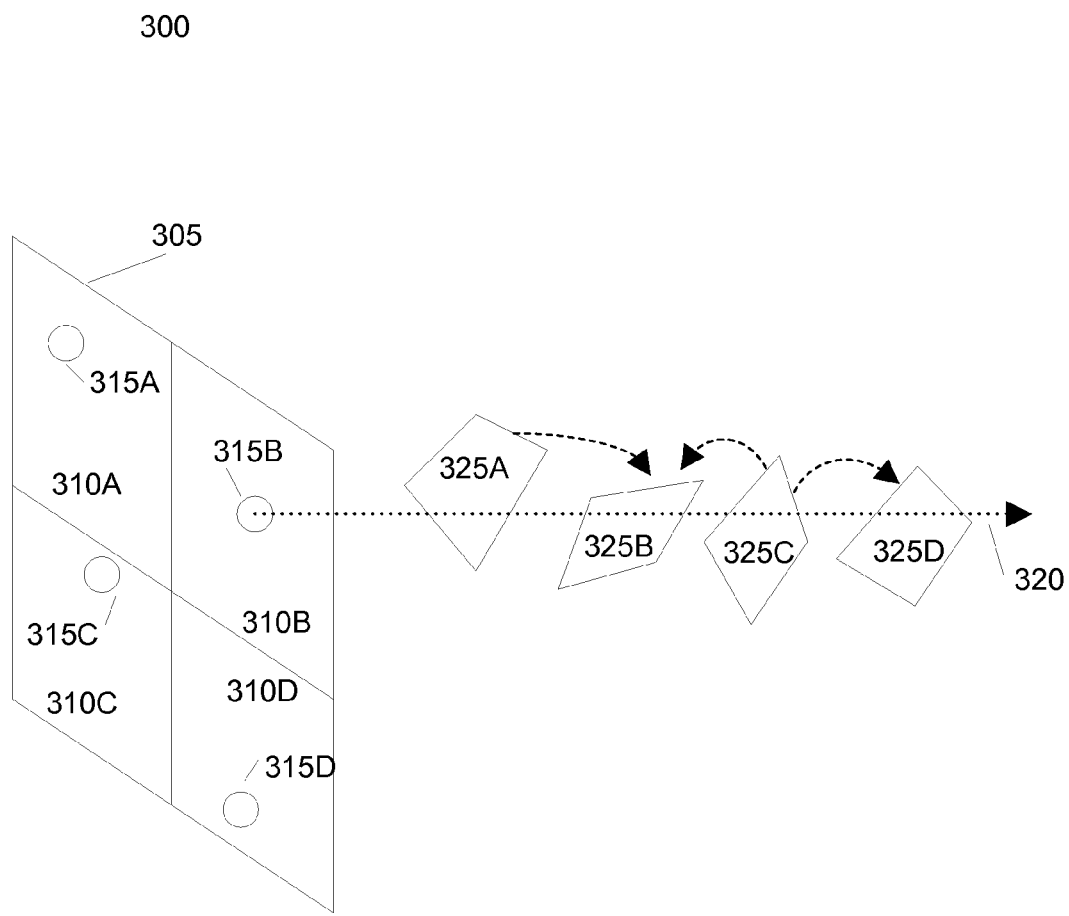
FIG. 3 illustrates an example application of visible surface compositing according to an embodiment of the invention.

FIG. 3 illustrates an example application 300 of visible surface compositing according to an embodiment of the invention. An image plane 305 is divided into a number pixels 310, including pixels 310A, 310B, 310C, and 310D. Each of the pixels 310 includes one or more image sample points 315, such as image sample points 315A, 315B, 315C, and 315D, where the scene geometry is sampled. The image sample points 315 of a pixel may be arranged in regular positions within the pixels, or random or pseudo-random locations within the pixels to minimize the appearance of aliasing.

Each of the image sample points 315 is associated with a specific line-of-sight through the scene. For example, image sample point 315B is associated with line of sight 320. Each of the image sample points 315, such as image sample point 315B shown in FIG. 3, has at least a color and transparency value determined from sampling the world geometry along its associated line of sight. Sampling world geometry can be performed by projecting a ray from the image sample point along the line-of-sight through the scene or by projecting world geometry on to the image plane 305 and determining the intersections of the projected world geometry with the image sample points.

In this example, there are four pieces of world geometry, referred to as geometry samples 325A, 325B, 325C, and 325D, intersecting the line-of sight 320 of the image sample point 315B. These geometry samples may be fragments of polygons or other types of surfaces, micro-polygons derived from dicing surfaces, as typically done by a REYES-type renderer, or portions of surfaces to be sampled by a ray-tracing renderer or other type of renderer.

Previously, the value of a sample was determined by compositing the geometry samples intersecting the line-of-sight of the image sample in depth order. For example, prior renderers composite the geometry in either front-to-back or back-to-front order. In an embodiment, the pieces of world geometry 325 may optionally be associated with visibility functions that can be used to override this depth order compositing. In an embodiment, an object, surface, or any other arbitrary size portion of world geometry can be associated with a visibility function. In an embodiment, if the geometry sample does not have a visibility function, its color, opacity, and/or any other attribute is composited into the image sample point according to its depth order.

Figure 4:
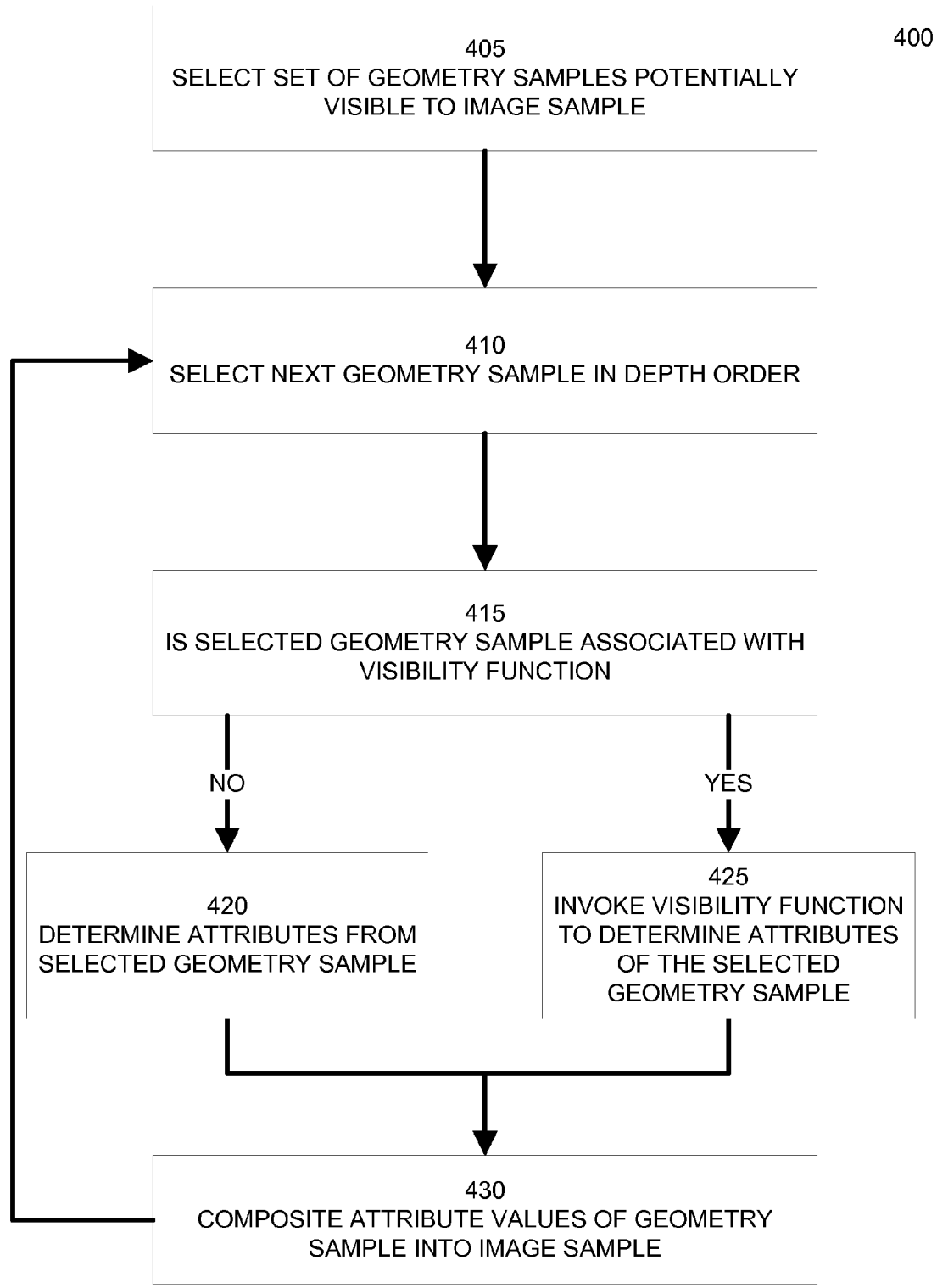
FIG. 4 illustrates a method of evaluating geometry samples associated with an image sample point according to an embodiment of the invention.

FIG. 4 illustrates a method 400 of evaluating geometry samples associated with an image sample point according to an embodiment of the invention. In an embodiment, a renderer assembles a set of geometry samples potentially visible to an image sample in step 405. In an embodiment, a renderer can process a scene graph or other set of scene geometry to create a set of potentially-visible geometry samples for each image sample point in at least a portion of an image. Typically, the renderer processes the scene graph or other set of scene geometry once to determine a complete set of potentially-visible geometry samples for one or more image sample point. Each of these geometry samples may be visible to the image sample or partially or entirely occluded by other geometry samples associated with the image sample. In an embodiment, the set of geometry samples are ordered according to depth or include depth values to facilitate the evaluation of the geometry samples in depth order.

A visible surface compositing module of a renderer traverses set of geometry samples associated with an image sample point in either front-to-back or back-to-front depth order. In step 410, the visible surface compositing module selects the next geometry sample in the depth order. As the visible surface compositing module traverses the set of geometry samples associated with an image sample, it determines the color, opacity, or any other attribute of each geometry sample. For each selected geometry sample, step 415 determines if the geometry sample is associated with a visibility function. If a geometry sample is not associated with a visibility function, these attributes are determined directly from the attributes of the geometry sample in step 420.

Conversely, if a geometry sample is associated with a visibility function, the visible surface compositing module invokes the visibility function in step 425 to determine the color, opacity, or other attribute value of the geometry sample. In an embodiment, a visibility function associated with a geometry sample can access the attributes, such as color, opacity, name, identifier, type, or any other arbitrary attribute, of any other geometry sample associated with the image sample point. In a further embodiment, a visibility function associated with a geometry sample can also determine the position in the depth order of any other geometry sample associated with the image sample point.

The visibility function determines color, opacity, or any other attribute value of a given geometry sample from the attributes of that geometry sample, attributes of one or more other geometry samples potentially visible to the image sample, and/or the positions in the depth order of one or more geometry samples. The visibility function can determine color, opacity, or any other attribute value from any arbitrary function of at least these inputs. Embodiments of the invention can implement visibility functions as programs or statically or dynamically loaded executable modules or function using any programming language, scripting language, or shading language known in the art.

The visibility function returns color, opacity, and/or any other required attribute value to the visible surface compositing module for compositing with attribute values of other geometry samples associated with the image sample point.

Regardless of whether the attributes of the geometry sample are determined from the geometry sample itself or from the execution of the visibility function, step 430 composites the attribute values of the geometry sample with the attribute values, if any, of the image sample point. Step 430 can use any compositing, transparency, or blending operation known in the art.

Following step 430, method 400 returns to step 410 to select the next geometry sample, if any, in the depth order associated with the image sample point. In a further embodiment, additional geometry samples in the depth order can be ignored if the image sample point is composited in front-to-back order and the image sample point has an opacity close to or equal to 100%.

In an embodiment, method 400 can be repeated for additional image sample points in the image plane.

In the example of FIG. 3, geometry sample 325 is associated with a visibility function dependent upon attribute values of geometry sample 325B behind the first piece. Similarly, a geometry sample 325C is associated with a visibility function dependent upon attribute values of the geometry sample 325B, which is in front of the third piece, and the attribute values of the geometry sample 325D, which is behind the third piece. The geometry samples 325B and 325D use only their own attributes to determine the value to return to the visible surface compositing module.

Embodiments of the visibility functions and visible surface compositing module may be applied in numerous ways to achieve a wide variety of results. For example, an object representing an eyelid needs to always be seen on top of an object representing an eyeball. To ensure that this arrangement is always enforced, regardless of minor deformations of the objects' geometry or small errors, a visibility function may be associated with the eyeball object. Each object includes an identifier attribute. This example visibility function will return its own color and transparency values if a geometry sample of the eyeball object is not in front of any geometry sample of the eyelid object. This determination is made by examining the identifier attributes of all geometry samples behind the current geometry sample. Conversely, if the geometry sample of the eyeball is in front of a geometry sample of the eyelid object, this example visibility function of the eyeball geometry sample will return the color and transparency values of the geometry sample of an eyelid object. Thus, this geometry sample of the eyeball object will have the attributes of the eyelid object, and thus appear to be part of the eyelid, rather than the eyeball.

In another example, some renderers perform motion blur by rendering a piece of geometry across a range of motion for a single sample. To optimize performance, these renderers may only determine lighting and shading for an object at a single position within this range of motion. If a rapidly moving object passes from an area of shadow to an area of light (or vice versa) within this range of motion, it is possible for the shadow to "bleed" into the unshadowed area.

Embodiments of the visibility functions and visible surface compositing module can be applied to correct for this. A first version of the object may be set to remain static with respect to the shadow. This first version may be white, rather than shaded and textured, and set to be invisible to the visible surface compositing module. This first version of the object will be rendered and its surface will be shaded with respect to one or more light sources. Shadows may be determined using shadow maps, shadow volumes, directly from ray tracing or global illumination techniques, or any other lighting and shadowing technique known in the art.

Continuing with this example, a second version of the object is set to move according to specifications from a user or other animation application. This second version of the object can be lit and shaded as normal. Motion blur can also be applied to this second version of the object. To prevent shadows from bleeding due to motion blur, shadows are not rendered on to the second version of the object.

To produce a shaded, motion-blurred version of the object without shadow bleeding, an example visibility function of associated with the second version of the object combines its own color and transparency attributes with the color and transparency attributes of any geometry sample of the first version of the object associated with the same image sample. In an example, the combination is performed by multiplying or otherwise blending these two attributes together. As a result, the color and transparency of a piece of the motion-blurred version of the object will be scaled by the shadow value of a piece of the static version of the object. Because the shadows are applied only to a static version of the object, there is no bleeding of shadows due to motion blur.

These example applications of embodiments of the visibility functions and visible surface compositing module are provide for the purpose of illustration and do not limit the scope of use for these embodiments. Furthermore, embodiments of the visibility functions and visible surface compositing module may be used in conjunction with the above-described systems and method for positioning objects with respect to a guide surface or alone. For example, an eyelid object can be positioned and deformed with respect to a guide surface. An example application of visibility functions and visible surface compositing module can then be applied to correct for any errors. Conversely, embodiments of the visibility functions and visible surface compositing module can prevent shadows from bleeding on motion-blurred objects, as described above, even when the object is not animated with respect to a guide surface.

Figure 5:
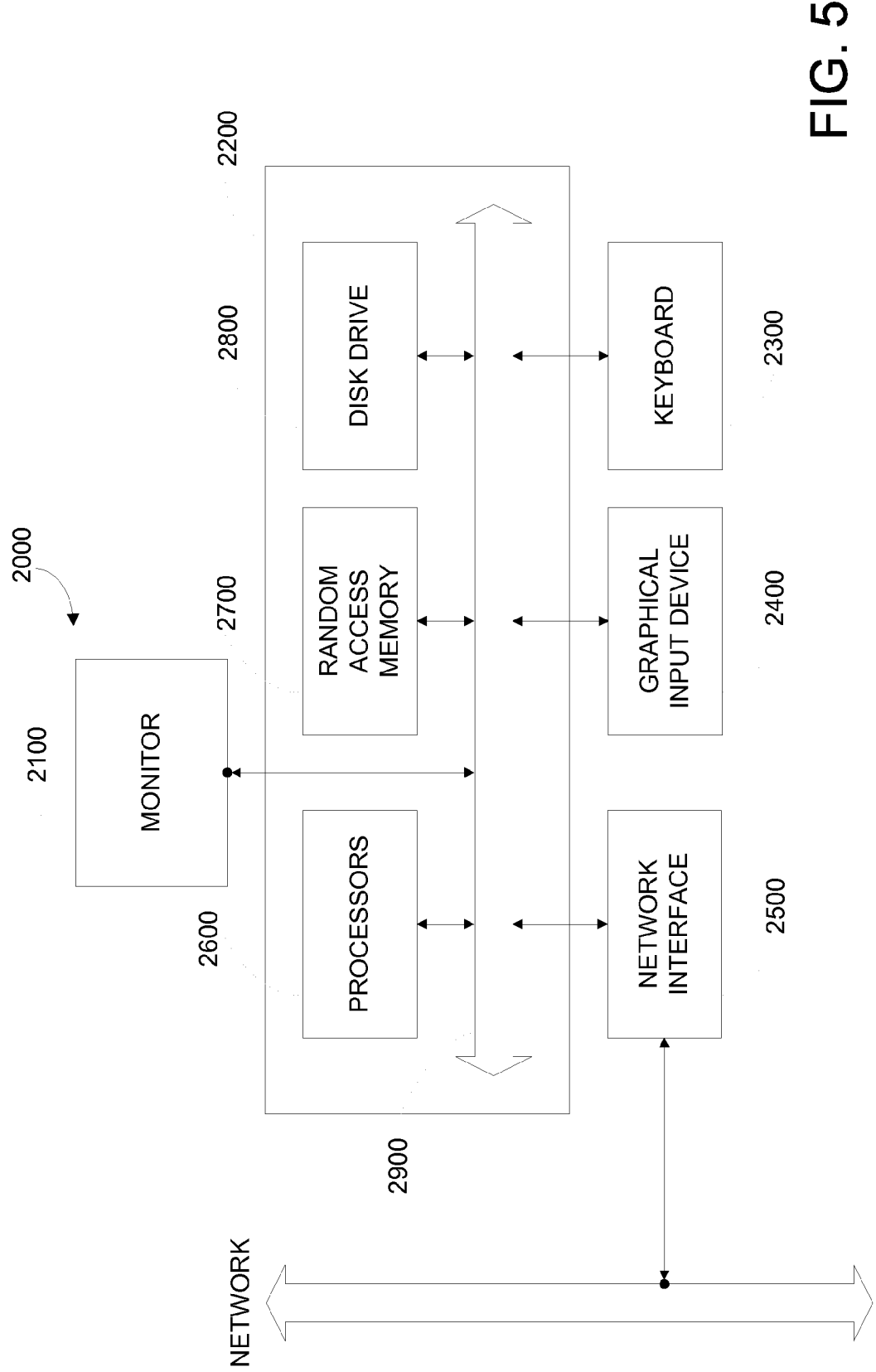
FIG. 5 illustrates a computer system suitable for implementing an embodiment of the invention.

FIG. 5 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. Embodiments of the invention may be incorporated into any type of real-time, interactive, and non-real-time renderers, such as rasterization renderers, REYES-type renderers, ray-tracing renderers, and global illumination renderers. Embodiments of the invention and associated renderers may be implemented using software executed by general-purpose computing devices, specialized computer graphics hardware, such as graphics processing units, or any combination of hardware and software. It will, however, be evident that various modifications and changes may be made thereunto without departing from the broader spirit and scope of the invention as set forth in the claims.

What is claimed is:

1. A method of moving a point with respect to a guide surface in a computer graphics system, the method comprising:
projecting a point expressed in a first coordinate frame into a parametric space defined by parametric directions on a guide surface and a normal direction of the guide surface, wherein the guide surface is in an unposed configuration;
determining coordinates of the projected point in the parametric space of the guide surface in the unposed configuration;
performing an operation to change the coordinates of the projected point within the parametric space to define a modified point;
using a processor, evaluating the guide surface at the modified point in the parametric space to determine a corresponding position in the first coordinate frame;
projecting a second point expressed in the first coordinate frame into the parametric space of the guide surface;
determining second coordinates of the second projected point in the parametric space of the guide surface;
performing the operation to change the second coordinates of the second projected point within the parametric space to define a second modified point; and
using the processor, evaluating the guide surface at the second modified point in the parametric space to determine a second corresponding position in the first coordinate frame.

2. The method of claim 1, further comprising:
modifying the guide surface to a first posed configuration; and
wherein evaluating the guide surface includes evaluating the guide surface at the modified point in the parametric space of the guide surface in the first posed configuration.

3. The method of claim 1, wherein the operation changes at least two dimensions of the coordinates of the projected point in the parametric space.

4. The method of claim 1, wherein the operation includes a scaling of the coordinates of the projected point in the parametric space.

5. The method of claim 1, wherein the operation includes a rotation of the coordinates of the projected point in the parametric space.

6. The method of claim 1, wherein the operation includes a translation of the coordinates of the projected point in the parametric space.

7. The method of claim 1, wherein the first coordinate space is a world coordinate frame.

8. The method of claim 1, wherein the first coordinate space is an object coordinate frame.

9. The method of claim 1, further comprising:
receiving a first animation variable value specifying a first motion of the point relative to the guide surface;
receiving a second animation variable value specifying a second motion of the point relative to the guide surface; and
defining the operation to change the coordinates of the point in the parametric space based on the combination of at least the first motion and the second motion.

10. The method of claim 9, wherein the first motion and second motions are selected from a group of motions consisting of sliding along the guide surface in at least one direction; and moving in a direction normal to the guide surface.

11. The method of claim 9, further comprising receiving at least one additional animation variable specifying the deformation of the guide surface to define the first posed configuration of the guide surface.

12. The method of claim 1, wherein the point is included in a object.

13. The method of claim 1, wherein the point is included in a set of particles.

14. The method of claim 1, wherein the point is a control point defining at least a portion of a surface.

15. A method of moving a point with respect to a guide surface in a computer graphics system, the method comprising:
- receiving animation variable values defining at least two independent motions of geometry including points with respect to a guide surface;
- projecting the points expressed in a first coordinate frame into a parametric space defined by parametric directions on a guide surface and a normal direction of the guide surface, wherein the guide surface is in an unposed configuration;
- determining coordinates of the projected points in the parametric space;
- determining net displacements of the projected points in the parametric space based on the at least two independent motions of the geometry specified by the received animation variable values;
- applying the net displacements to the projected points within the parametric space to define modified points; and
- using a processor, evaluating the guide surface at the modified points in the parametric space to determine corresponding positions of the modified points in the first coordinate frame.

16. The method of claim 15, wherein the independent motions of the point include a surface warp.

17. The method of claim 15, wherein the independent motions of the point include a patch pulling.

18. The method of claim 15, wherein the independent motions of the point include a normal translate.

19. The method of claim 15, further comprising:
- modifying the guide surface to the first posed configuration, wherein the animation variable values include a specification of a first posed configuration of the guide surface; and
- wherein evaluating the guide surface includes evaluating the guide surface at the modified point in the parametric space of the guide surface in the first posed configuration.

20. The method of claim 15, wherein the operation changes at least two dimensions of the coordinates of the projected point in the parametric space.

21. The method of claim 15, wherein the net displacement includes a scaling of the coordinates of the projected point in the parametric space.

22. The method of claim 15, wherein the net displacement includes a rotation of the coordinates of the projected point in the parametric space.

23. The method of claim 15, wherein the net displacement includes a translation of the coordinates of the projected point in the parametric space.

24. The method of claim 15, wherein the first coordinate space is a world coordinate frame.

25. The method of claim 15, wherein the first coordinate space is an object coordinate frame.

26. The method of claim 15, wherein the point is included in a object.

27. The method of claim 15, wherein the point is included in a set of particles.

28. The method of claim 15, wherein the point is a control point defining at least a portion of a surface.

* * * * *